United States Patent [19]
Katamachi

[11] Patent Number: 6,135,103
[45] Date of Patent: Oct. 24, 2000

[54] WIRE SAW FOR SLICING BRITTLE MATERIALS WITH AN INGOT LOADING AND UNLOADING MECHANISM

[75] Inventor: Shozo Katamachi, Mitaka, Japan

[73] Assignee: Tokyo Seimitsu Co., Ltd., Tokyo, Japan

[21] Appl. No.: 09/205,278

[22] Filed: Dec. 4, 1998

[30] Foreign Application Priority Data

Dec. 8, 1997 [JP] Japan .................................... 9-337312

[51] Int. Cl.⁷ .............................. B28D 1/06; B28D 1/08
[52] U.S. Cl. ...................... 125/21; 125/16.02; 451/339
[58] Field of Search ....................... 83/651.1; 125/16.01, 125/16.02, 21; 451/339, 365, 451

[56] References Cited

U.S. PATENT DOCUMENTS 2,655,067  10/1953  Bechler .
4,766,699  8/1988  Gottschald et al. .
4,882,881  11/1989  VanKuiken, Jr. et al. .
5,771,876  6/1998  Egglhuber ................................. 125/21
5,829,424  11/1998  Hauser .................................. 125/16.01
5,893,308  4/1999  Katamachi et al. ........................ 83/13
5,897,430  4/1999  Haller ...................................... 451/451
5,904,136  5/1999  Nagatsuka et al. .................. 125/16.02

*Primary Examiner*—Timothy V. Eley
*Attorney, Agent, or Firm*—Nixon Peabody LLP; David S. Safran

[57] ABSTRACT

An opening for loading and unloading ingots is formed at the top of a cover, which covers a processing chamber wherein grooved rollers of a wire saw are disposed. The ingots are exchanged from above the cover through the opening. Even if a plurality of wire saws are arranged at short intervals, the adjacent wire saws can exchange the ingots at the same time, Thus, the ingots can be exchanged efficiently.

1 Claim, 6 Drawing Sheets

F I G. 1
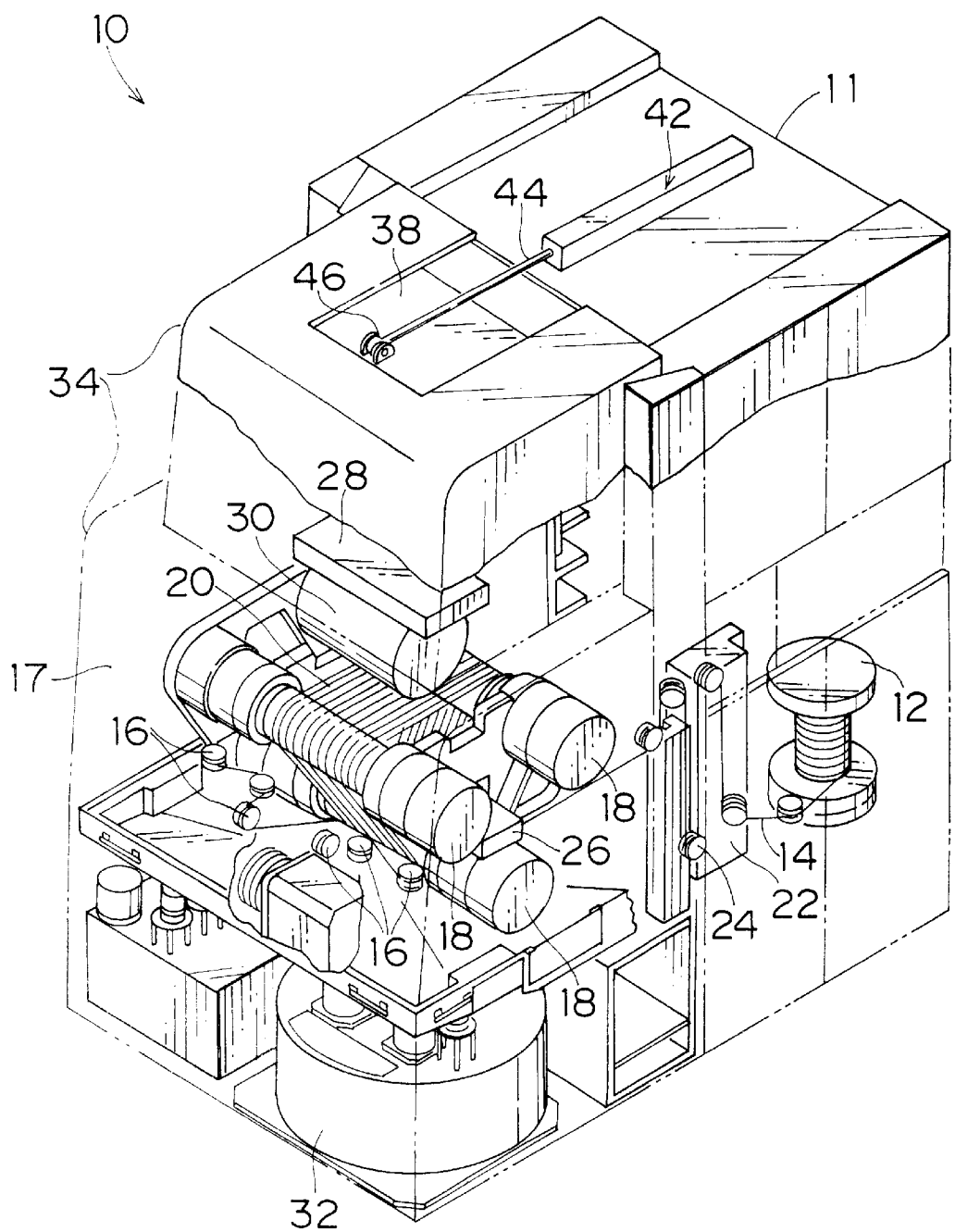

WIRE SAW FOR SLICING BRITTLE MATERIALS WITH AN INGOT LOADING AND UNLOADING MECHANISM

BACKGROUND OF THE INVENTION

1. Field of the Invention

The present invention relates to a wire saw, and more particularly to a wire saw which slices brittle material (workpiece) such as silicon, glass and ceramics into a number of wafers.

2. Description of Related Art

A wire saw which slices a silicon ingot into wafers winds a wire on a plurality of grooved rollers to form a wire row between the grooved rollers. The ingot is pressed against the running wire row to be sliced into a number of wafers in one cutting action. The wire saw is constructed in such a way that an opening for loading and unloading the ingot is formed at the side of a cover, which covers the processing chamber where the grooved rollers are arranged. The cover is provided with a lid for opening and closing the opening.

FIG. 6 is a plan view showing the state wherein the above-mentioned wire saws A–F are arranged in three rows of two in a plant 1. In this case, the No. 1 wire saw A and the No. 4 wire saw D exchange the ingots in a space G enclosed by long and two short alternate lines. The No. 2 wire saw and the No. 5 wire saw E exchange the ingots in a space H enclosed by long and two short alternate lines. The No. 3 wire saw C and the No. 6 wire saw F exchange the ingots in a space I enclosed by long and two short alternate lines.

The above-mentioned wire saw, however, is constructed in such a way that the opening for loading and unloading the ingot is formed at the side of the cover. For this reason, while the No. 1 wire saw A is exchanging the ingots for example, the No. 4 wire saw D could not exchange the ingots. This is very inefficient.

To solve the above-mentioned problem, the plant 1 as a whole must be widened to increase the exchange spaces G–I.

SUMMARY OF THE INVENTION

The present invention has been developed in view of the above-described circumstances, and has as its object the provision of a wire saw which is capable of exchanging workpieces efficiently in a small space if a plurality of wire saws are arranged parallel.

To achieve the above-mentioned object, the present invention is directed to a wire saw which winds a wire on a plurality of grooved rollers to form a wire row and runs said wire to press a workpiece against said wire row, thereby slicing said workpiece into a number of wafers, said wire saw comprising: an opening for loading and unloading said workpiece, said opening being formed at the top of a cover which covers a processing chamber wherein said plurality of grooved rollers are disposed; and a lid for opening and closing said opening.

According to the present invention, the opening for loading and unloading the workpiece is formed at the top of the cover which covers the processing chamber. For this reason, the workpieces can be exchanged from above the cover. Even if a plurality of wire saws are arranged at short intervals, the adjacent wire saws can exchange the workpieces at the same time. Thus, the workpieces can be exchanged efficiently even in a small space.

According to the present invention, the workpiece, which has been loaded in the wire saw through the opening of the cover, is fixed in such a manner that an ingot mounting block of the workpiece is placed on a placing part of the workpiece feed table and then a cramp means cramps (or clamps) the ingot mounting block between the placing part and the cramp means. With the feed of the workpiece feed table, the fixed workpiece is pressed against the wire rows to be sliced into a number of wafers. Since the placing part and the cramp means are provided on the workpiece feed table, the workpiece can easily be fixed on the workpiece feed table. After the cramp means releases the workpiece, the reverse operation to the workpiece loading operation is performed so that the sliced workpiece after the cutting can be unloaded from the wire saw.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating an embodiment of a wire saw;

DETAILED DESCRIPTION OF THE PREFERRED EMBODIMENT

Figure 2:
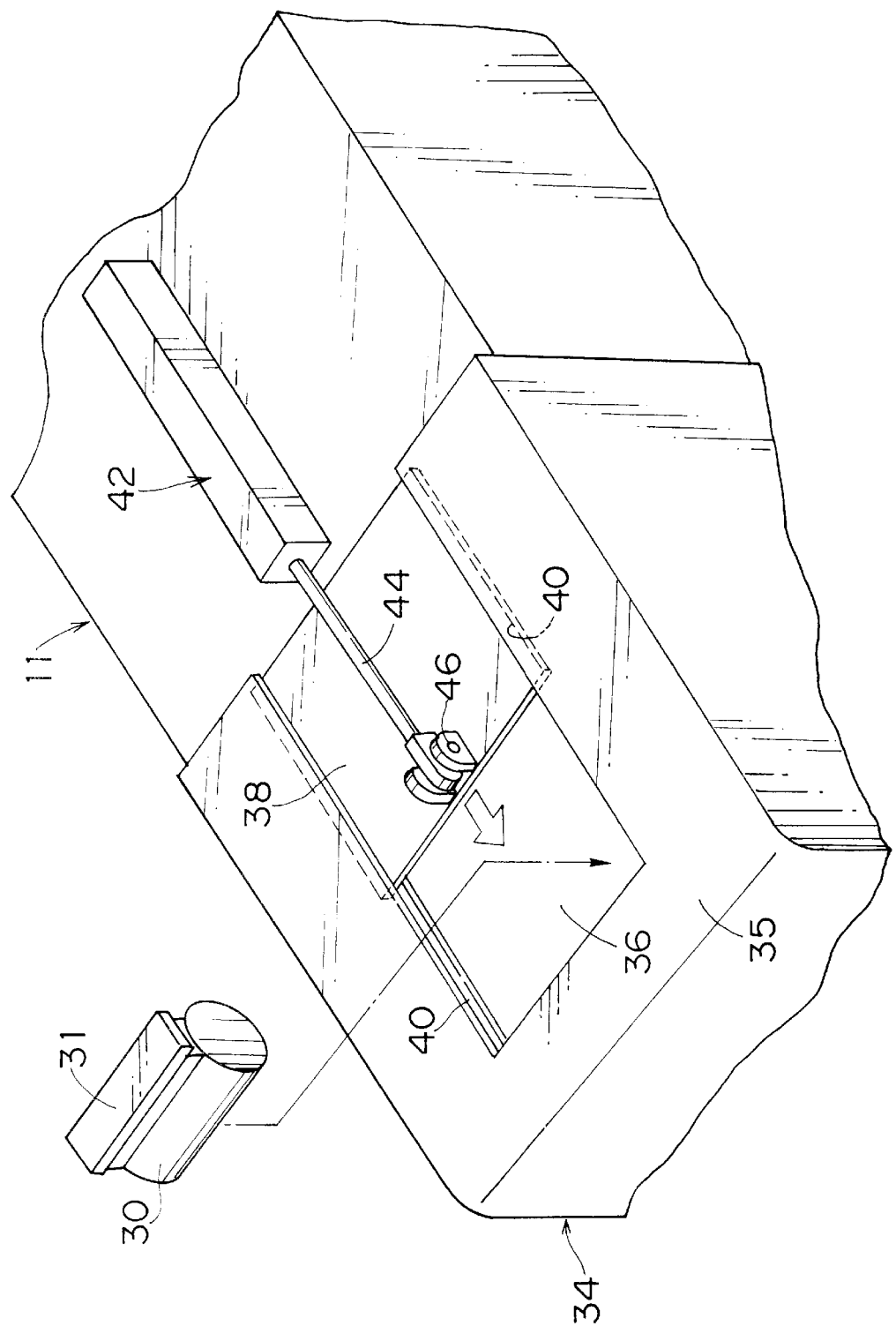
FIG. 2 is a view of assistance in explaining the state wherein an ingot is loaded in the wire saw in FIG. 1 from above.

This invention will be described in further detail by way of example with reference to the accompanying drawings.

FIG. 1 shows the entire structure of a wire saw including a partial cut away view according to an embodiment of the present invention.

A wire reel 12 is placed in a body 11 of the wire saw 10 in FIG. 1. A wire 14 with a predetermined length is wound on the wire reel 12, and the wire 14 is fed to a processing chamber 17 through a wire running route formed by guide rollers 16. The wire 14 is wound on three grooved rollers 18 to thereby form a horizontal wire row 20 between the upper two grooved rollers 18. Then, the wire 14 is wound on a wire reel (not illustrated) through a wire running route at the opposite side of the above-mentioned wire running route across the processing chamber 17.

A wire guide apparatus 22, a dancer roller 24, etc. are arranged on the wire running routes formed at both sides of the processing chamber 17 (only one side is illustrated). The wire guide apparatus 22 guides and runs the wire 14 at a constant pitch from the wire reel 12. The dancer roller 24 applies a constant tension to the running wire 14, and thus, a tension resistant to a slicing resistance is applied to each wire 14 which forms the wire row 20.

Motors (not illustrated) respectively connect to the pair of wire reels 12 and one of three grooved rollers 18. Running these motors runs the wire 14 at a high speed between the wire reels 12.

A workpiece feed table 28 is arranged above the grooved rollers 18, and it rises and falls vertically with respect to the wire row 20. An ingot 30 is fixed to the workpiece feed table 28. The workpiece feed table 28 will be described later.

The wire saw 10, which is constructed in the above-mentioned manner, slices the ingot 30 as described below. After the ingot 30 is fixed to the workpiece feed table 28, the workpiece feed table 28 is moved toward the wire row 20. Then, the ingot 30 is pressed against the wire row 20, which is running at a high speed. Slurry is supplied to the wire row 20 from a slurry tank 32 through a nozzle (not illustrated), and the ingot 30 is sliced into a number of wafers in a lapping operation of abrasive grains included in the slurry.

As shown in FIG. 2, an opening 36 is formed at a top 35 of a cover 34, which covers the processing chamber 17 of the wire saw 10. The opening 36 is formed in a size suitable for loading the ingot 30 into the processing chamber 17 from the outside and unloading the ingot 30 from the processing chamber 17 to the outside. The opening 36 is provided with a lid 38, which opens and closes the opening 36. The lid 38 is slidably provided along rails 40, which are formed at the edge of the opening 36. The lid 38 connects to the end of a rod 44 of a cylinder 42 placed on the body 11 via a pin joint 46. The cylinder 42 is arranged in such a direction to open and close the lid 38. Expansion of the rod 46 closes the opening 36 with the lid 38, and contraction of the rod 46 opens the opening 36.

Figure 3:
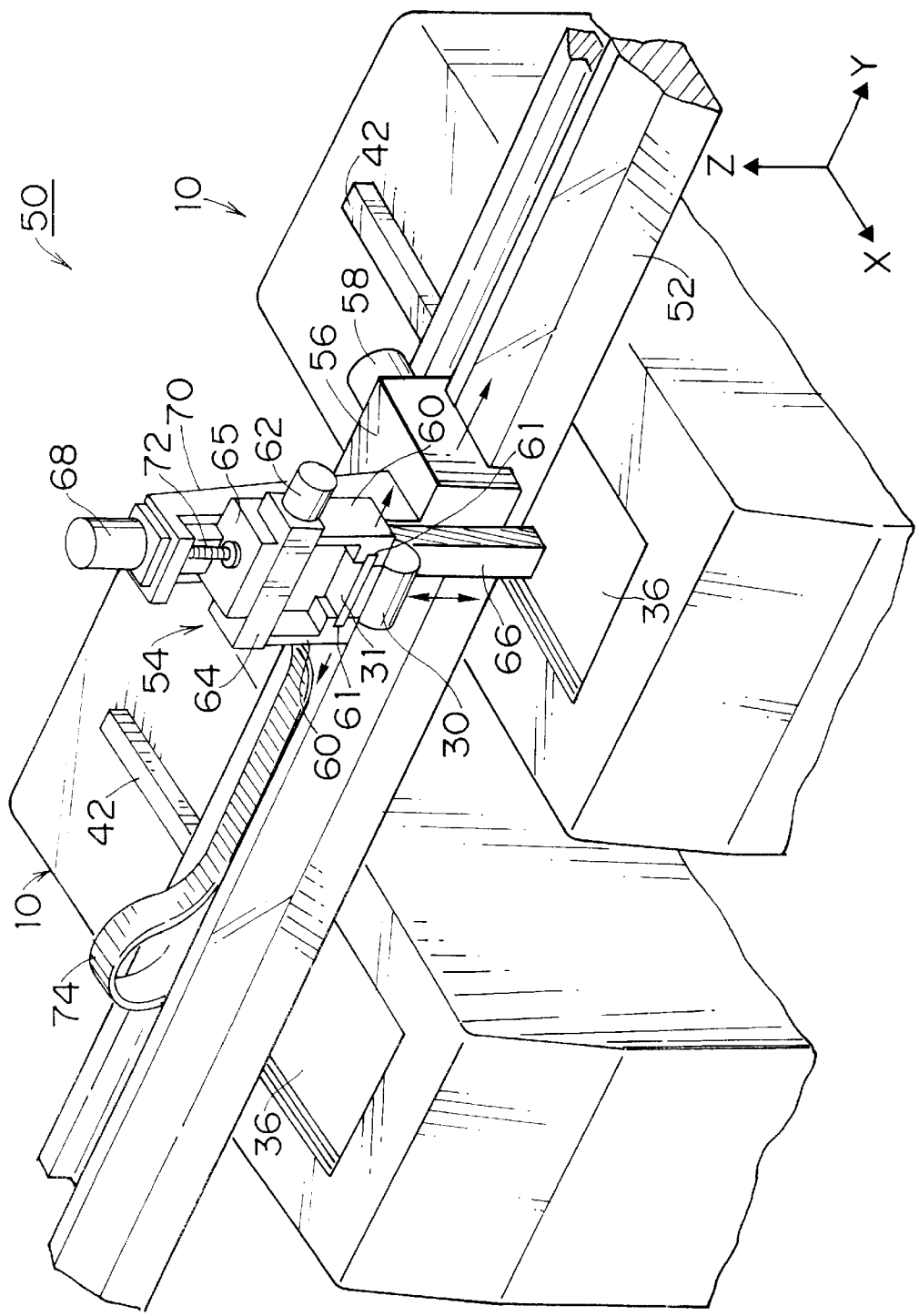
FIG. 3 is a perspective view illustrating an ingot loading and unloading apparatus.

FIG. 3 is a perspective view illustrating an embodiment of a loading and unloading apparatus 50 for the ingot 30.

The loading and unloading apparatus 50 consists of a rail 52 and a transport head 54. The rail 52 is formed along a ceiling of a structure such as a plant, etc., and it is arranged above the parallel wire saws 10 (only two wire saws 10 are illustrated in FIG. 3) and at the opposite side of the opening 36. The transport head 54 is slidably provided on the rail 52.

The transport head 54 has a slider 56, which is slidably connected to the rail 52. The slider 56 is provided with a motor 58. Running the motor 58 causes the slider 56 to move along the rail 52, and therefore, the transport head 54 moves to a desired position in a direction Y.

An ingot cramp (or clamp) mechanism and an ingot feed mechanism are loaded in the slider 56. The ingot cramp mechanism consists of a pair of cramp (or clamp) arms 60 and a cramp (or clamp) motor 62. The cramp arms 60 are slidably supported on a base plate 64 in the direction Y in FIG. 3. The transmission of a driving force from the cramp motor 62 causes the pair of cramp arms 60 to move farther or closer to one another. Concave parts 61 are formed at the lower parts of the cramp arms 60, and the ends of an ingot mounting block 31 is cramped between the concave parts 61. It is therefore possible to hold the ingot 30 in the loading and unloading apparatus 50 by driving the cramp arms 60 with the cramp motor 62 in such a direction to move closer to one another and cramping the end of the ingot mounting block 31 between the concave parts 61 of the cramp arms 60. It is possible to release the ingot 30 by driving the cramp arms 60 with the cramp motor 62 in such a direction to move farther from one another.

The ingot feed mechanism consists of a Z-axis guide 66 and a feed motor 68. The Z-axis guide 66 is fixed on a rack 70 which stands on the slider 56, and the base plate 64 is connected to the Z-axis guide 66 in such a way as to move vertically along the Z-axis. An output shaft (not illustrated) of the feed motor 68 connects to a screw rod 72. A nut part 65 of the base plate 64 is connected to the screw rod 72. Running the feed motor 68 forward and backward moves the ingot 30 vertically through the base plate 64. Reference numeral 74 indicates a flexible cable, and the electricity is supplied from a power source apparatus (not illustrated) to the loading and unloading apparatus 50 through the flexible cable 74.

Figure 4:
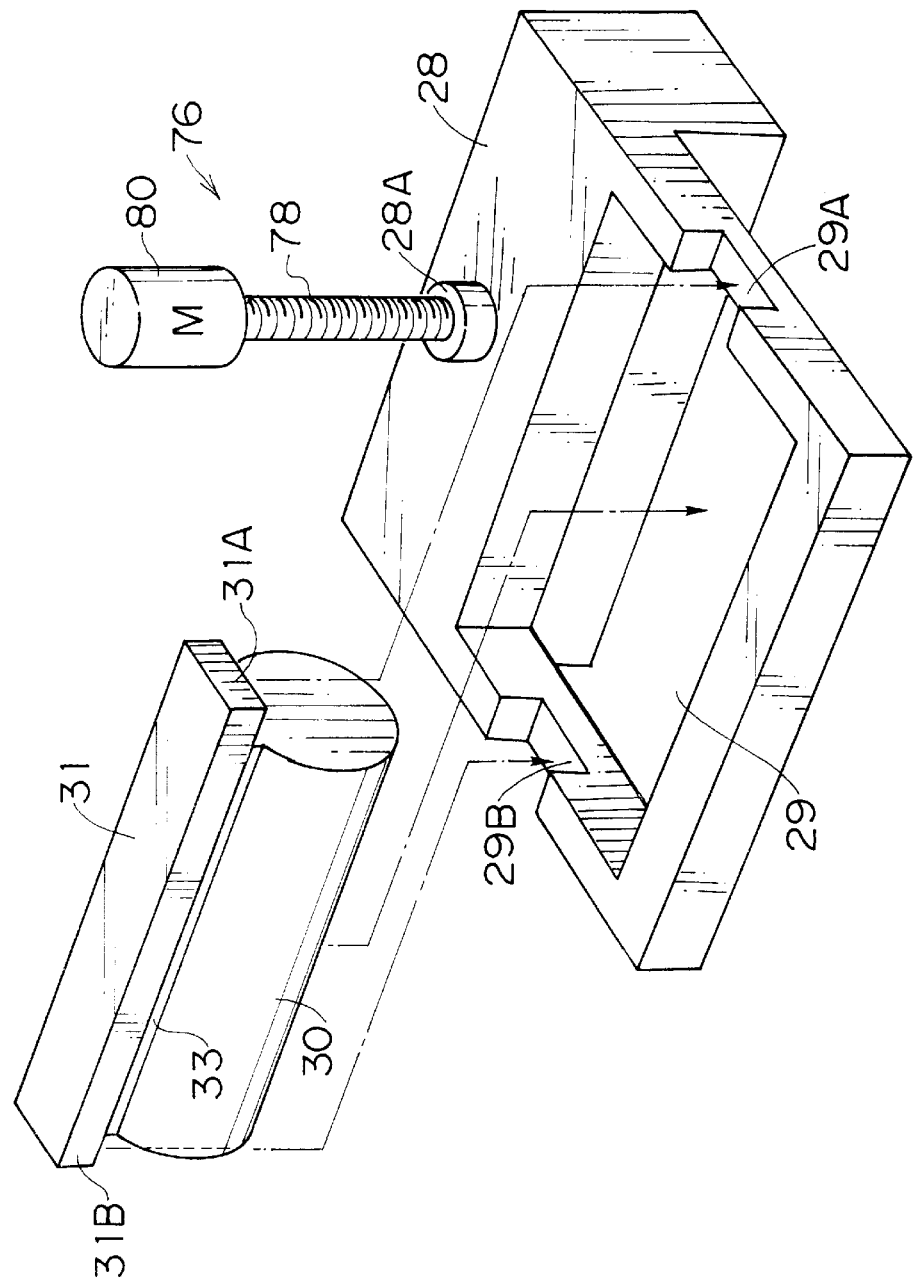
FIG. 4 is a perspective view illustrating a workpiece feed table.
Figure 5:
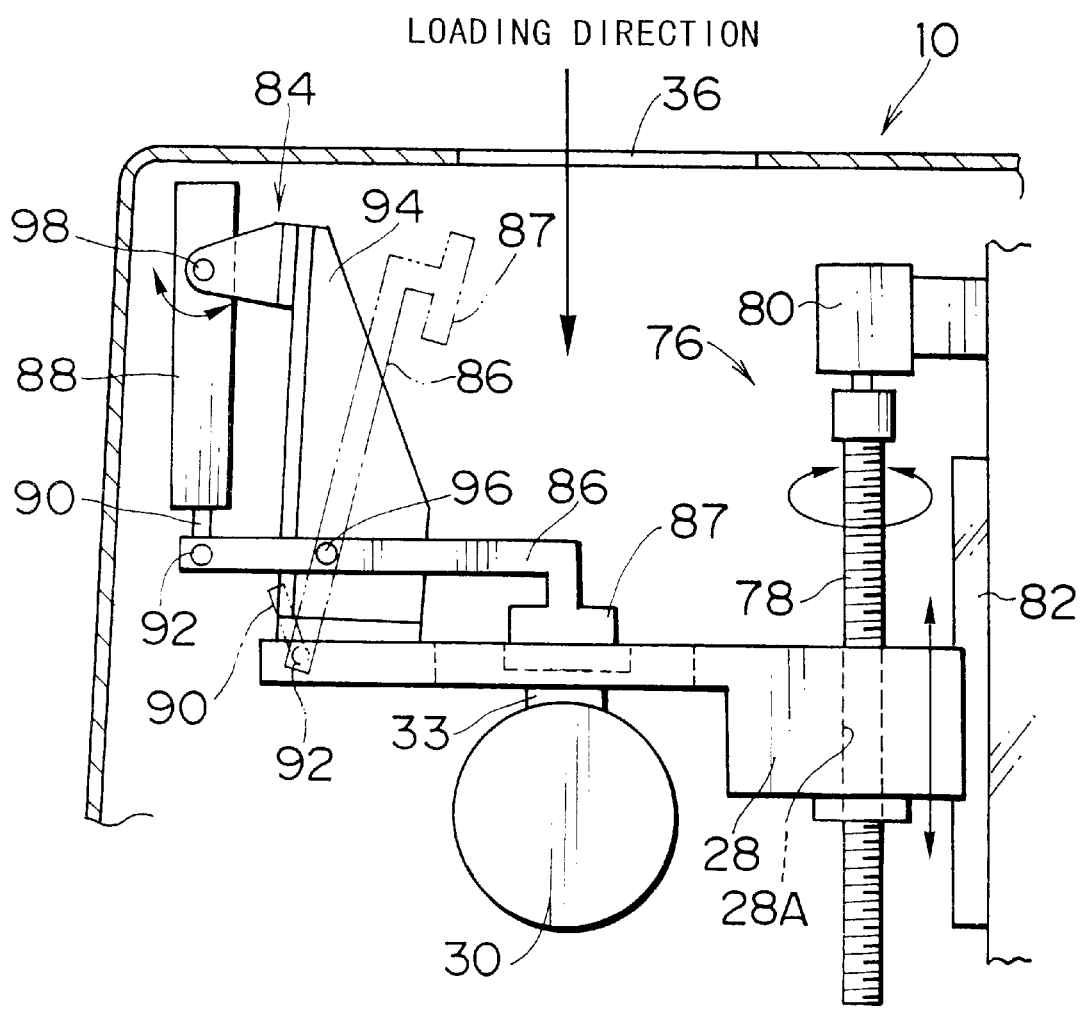
FIG. 5 is a side view illustrating a cramp apparatus including a workpiece feed table.
Figure 6:
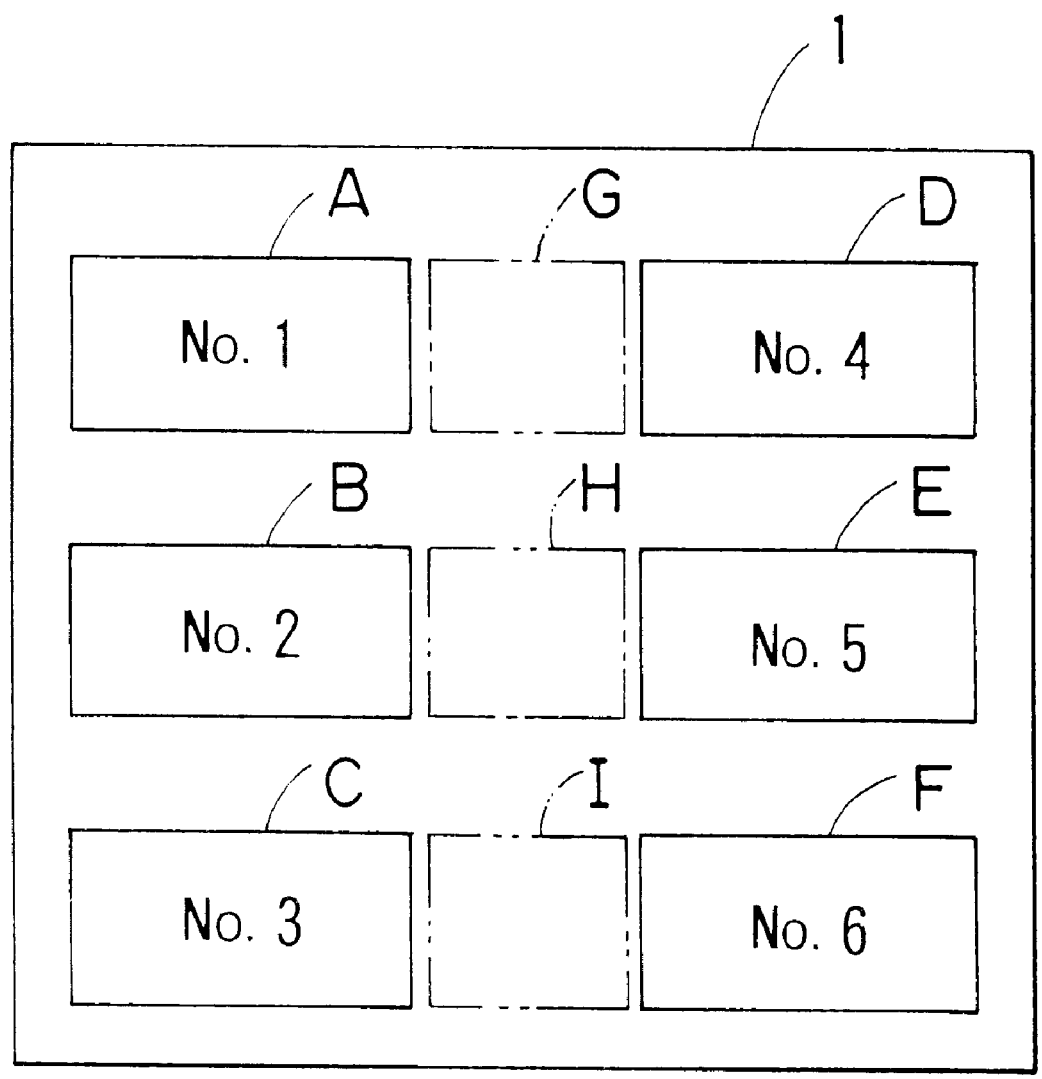
FIG. 6 is a plane view illustrating the state wherein six wire saws are arranged parallel in two columns.

FIG. 4 is a view of assistance in explaining the state wherein the ingot 30 is set on the workpiece feed table 28. FIG. 5 is a view of assistance in explaining the state wherein the ingot 30 is fixed on the workpiece feed table 28.

Although not illustrated in FIG. 4, the ingot 30 is cramped by the cramp arms 60 of the loading and unloading apparatus 50 in FIG. 3. The feed motor 68 moves the ingot 30 downward, and the ingot 30 is loaded in the processing chamber 17 through the opening 36 at the top of the cover 34. Then, the ingot 30 is mounted on the workpiece feed table 28. A rectangular opening 29 is formed on the surface of the workpiece feed table 28 so that the ingot 30 can pass through the opening 29. Concave parts (placing parts) 29A, 29B are formed at both short dimensions of the opening 29. A short side right end 31A of the ingot mounting block 31 is placed on the concave parts 29, and a short side left end 31B of the ingot mounting block 31 is placed on the concave parts 29B. Consequently, the ingot 30 is set on the workpiece feed table 28. Reference numeral 33 indicates a slice base mounting beam, through which the ingot 30 is attached to the ingot mounting block 31. A screw rod 78 of a screw feed apparatus 76 is connected to a nut part 28A of the workpiece feed table 28. The workpiece feed table 28 is supported by the Z-axis guide 82 in FIG. 5 in such a way as to move vertically. Running the motor 80 of the screw feed apparatus 76 forward and backward causes the workpiece feed table 28 to move vertically along the Z-axis guide 82.

On the other hand, a cramp mechanism 84 is provided on the workpiece feed table 28 as shown in FIG. 5. The cramp mechanism 84 is not illustrated in FIGS. 1 and 4 for the convenience's sake.

The cramp mechanism 84 is comprised mainly of a cramp arm 86 and a cylinder apparatus 88. The bottom end of the cramp arm 86 is rotatably supported at the end of a rod 90 of the cylinder apparatus 88 via a pin 92. The part, which is a little higher than the bottom end, is rotatably supported by a frame 94, which stands on the workpiece feed table 28, through a pin 96. The upper part of the cylinder apparatus 88 is rotatably supported by the frame 94 through a pin 98.

When the rod 90 of the cylinder apparatus 88 is contracted as indicated by a solid line in FIG. 5, the cramp arm 86 rotates clockwise from a position indicated by long and two short alternate lines. The short side right end 31A of the ingot mounting block 31 is cramped (or clamped) between a pressing part 87 of the cramp arm 86 and the concave part 29A (see FIG. 4) of the workpiece feed table 28, and the short side left end 31B of the ingot mounting block 31 is cramped between the pressing part 87 and the concave part 29B of the workpiece feed table 28. Consequently, the ingot 30 is fixed on the workpiece feed table 28. The expansion of the rod 90 of the cylinder apparatus 88 moves the cramp arm 86 farther from the cramping position, so that the ingot 30 can be released.

A description will be given of the operation of the loading and unloading apparatus 50 for the ingot 30 and the cramp mechanism 84, which are constructed in the above-mentioned manner.

When the ingot 30, which is cramped by the cramp arms 60 of the loading and unloading apparatus 50, is transported to a position above the wire saw 10 as shown in FIG. 3, the cylinder apparatus 42 of the wire saw 10 is driven to open the lid 38, which causes the opening 36 to be exposed.

Then, the feed motor 68 of the loading and unloading apparatus 50 is run forward to move the ingot 30 downward.

Then, the ingot 30 is loaded in the processing chamber 17 through the opening 36 of the wire saw 10, and is set on the workpiece feed table 28. Specifically, when the ingot 30 is sufficiently close to the workpiece feed table 28, the cramp motor 62 drives the cramp arms 60 in such a direction to move farther from one another. The short side right end 31A of the ingot mounting block 31 is placed in the concave part 29A of the workpiece feed table 28, and the short side left end 31B of the ingot mounting block 31 is placed in the concave part 29B. This completes the setting of the ingot 30 on the workpiece feed table 28. When the ingot 30 is set on the workpiece feed table 28, the cramp arm 86 of the cramp mechanism 84 is located away from the loading route of the ingot 30 (a position indicated by long and two short alternate lines in FIG. 5) to prevent the cramp arm 86 from colliding with the ingot 30.

After the ingot 30 is set on the workpiece feed table 28, the feed motor 68 of the loading and unloading apparatus 50 is reversed to lift the cramp arms 60. When the cramp arms 60 return to the original positions in FIG. 3 through the opening 36, the feed motor 68 is stopped. Then, the cylinder apparatus 42 of the wire saw 10 is driven to close the opening 36 with the lid 38.

Upon the passage of the cramp arms 60 through the opening 36, the cramp mechanism 84 is driven. Specifically, the rod 90 of the cylinder apparatus 88 contracts as indicated by a solid line in FIG. 5, and the cramp arm 86 rotates clockwise around the pin 96 from the position indicated by long and short alternate lines in FIG. 5. Therefore, the short side right end 31A of the ingot mounting block 31 is cramped (or clamped) between the pressing part 87 of the cramp arm 86 and the concave part 29A (see FIG. 4) of the workpiece feed table 28, and the short side left end 31B of the ingot mounting block 31 is cramped (or clamped) between the pressing part 87 and the concave part 29B of the workpiece feed table 28. Consequently, the ingot 30 is fixed on the workpiece feed table 28.

When the ingot 30 is fixed, the screw feed apparatus 76 moves the workpiece feed table 28 downward, and the ingot 30 is pressed against the wire row 20 to be sliced into wafers.

When the ingot 20 is sliced into wafers, the workpiece feed table 28 returns to the ingot setting position in FIG. 5. Then, the loading and unloading apparatus 50 and the cramp mechanism 84 perform the reverse operation to the previously-described operation so that the wafer can be unloaded from the wire saw 10. This completes the processing for one ingot 30. If a plurality of loading and unloading apparatuses 50 are provided on one rail 52, the adjacent wire saws 10 can exchange the ingots 30 at the same time.

As stated above, the wire saw of this embodiment is constructed in such a way that the opening 36 for loading and unloading the ingot 30 is formed at the top 35 of the cover 34 which covers the processing chamber 17, and therefore, the ingots 30 can be exchanged from above the cover 34. Even if the wire saws 10 are arranged at short intervals, the adjacent wire saws 10 can exchange the ingots 30 at the same time. Thus, the ingots 30 can be exchanged efficiently even in a small space.

According to the present invention, the workpiece feed table 28 is provided with the cramp mechanism 84 and the concave parts 29A, 29B for supporting the ingot 30. Thus, the ingot 30 can be fixed automatically on the workpiece feed table 28.

As set forth hereinabove, according to the wire saw of the present invention, the opening for loading and unloading the workpieces is formed at the top of the cover which covers the processing chamber. Thus, the workpieces can be exchanged from above the cover. For this reason, even if a plurality of wire saws are arranged at short intervals, the adjacent wire saws can exchange the workpiece at the same time. The workpieces can be exchanged efficiently even in a small space.

According to the present invention, the workpiece feed table is provided with the cramp means and the placing part, on which the ingot mounting block of the workpiece is placed. For this reason, the workpiece can easily be fixed on the workpiece feed table.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A wire saw which winds a wire on a plurality of grooved rollers to form a wire row and runs said wire to press a workpiece against said wire row, thereby slicing said workpiece into a number of wafers, said wire saw comprising:

an opening for loading and unloading said workpiece, said opening being formed at the top of a cover which covers a processing chamber wherein said plurality of grooved rollers are disposed; and a lid for opening and closing said opening;

wherein said processing chamber has a workpiece feed table which feeds said workpiece toward said wire row, said workpiece feed table being provided with a placing part, on which an ingot mounting block loaded through said opening is placed, and cramp means which cramps said ingot mounting block placed on said placing part between said cramp means and said placing part.

\* \* \* \* \*